(12) United States Patent
Lanter

(10) Patent No.: US 11,255,060 B2
(45) Date of Patent: Feb. 22, 2022

(54) ENERGY ABSORPTION DEVICE

(71) Applicant: Geobrugg AG, Romanshorn (CH)

(72) Inventor: Andreas Lanter, Amriswil (CH)

(73) Assignee: Geobrugg AG, Romanshorn (CH)

(*) Notice: Subject to any disclaimer, the term of this patent is extended or adjusted under 35 U.S.C. 154(b) by 25 days.

(21) Appl. No.: 16/632,000

(22) PCT Filed: Jul. 19, 2018

(86) PCT No.: PCT/EP2018/069667
§ 371 (c)(1),
(2) Date: Jan. 17, 2020

(87) PCT Pub. No.: WO2019/016330
PCT Pub. Date: Jan. 24, 2019

(65) Prior Publication Data
US 2020/0232172 A1 Jul. 23, 2020

(30) Foreign Application Priority Data

Jul. 21, 2017 (DE) .................... 10 2017 116 531.2

(51) Int. Cl.
*E01F 7/04* (2006.01)
*F16F 7/12* (2006.01)

(52) U.S. Cl.
CPC .............. *E01F 7/045* (2013.01); *F16F 7/128* (2013.01)

(58) Field of Classification Search
CPC ............ F16F 7/123; F16F 7/128; E01F 7/045
(Continued)

(56) References Cited

U.S. PATENT DOCUMENTS 9,677,231 B2  6/2017  Stelzer et al.
9,893,506 B2  2/2018  Backe et al.
(Continued)

FOREIGN PATENT DOCUMENTS

CN  201554029 U  8/2010
CN  205205702 U  5/2016
(Continued)

OTHER PUBLICATIONS

EPO translation, FR 2956714 A1. (Year: 2011).*
(Continued)

*Primary Examiner* — Thomas J Williams
(74) *Attorney, Agent, or Firm* — Posz Law Group, PLC

(57) ABSTRACT

An energy absorption device for safety nets and/or for rope constructions, in particular an impact damping device and/or a shock damping device and/or a traction rope brake device, has a brake unit which comprises at least one deflection element and at least one brake element extending at least section-wise around the deflection element and which is configured for an at least partial absorption and/or conversion of kinetic energy in at least one load case, in particular an impact case, and has a connection unit, which is configured for a fixation of the brake unit in at least one location of use, wherein the brake element is guided around the deflection element in a U-shape,
wherein the brake element includes at least one first brake portion and at least one second brake portion, the brake portions differing from one another at least in regard to their local load capacities, and the first brake portion including at least one material recess, in particular an oblong hole.

17 Claims, 5 Drawing Sheets

Figure 1:
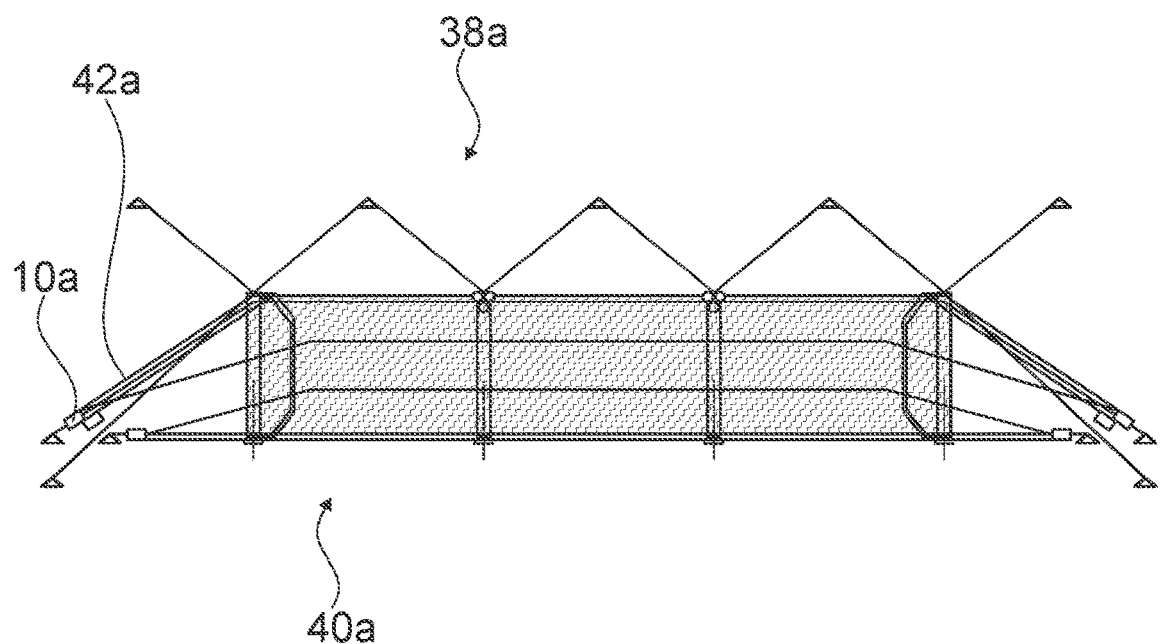

(58) Field of Classification Search
USPC .................................................. 188/373, 374
See application file for complete search history.

(56) References Cited

U.S. PATENT DOCUMENTS

| | | | |
|---|---|---|---|
| 9,958,022 | B2 | 5/2018 | Braun et al. |
| 2003/0042723 | A1 | 3/2003 | Riefe |
| 2003/0111310 | A1 | 6/2003 | Renton et al. |
| 2006/0033320 | A1 | 2/2006 | Finkheiner et al. |
| 2011/0067966 | A1 | 3/2011 | Von Allmen et al. |
| 2014/0251059 | A1 | 9/2014 | Russell et al. |

FOREIGN PATENT DOCUMENTS

| | | | | |
|---|---|---|---|---|
| CN | 205295975 | U | 6/2016 | |
| CN | 205295976 | U | 6/2016 | |
| EP | 2 274 535 | B1 | 2/2016 | |
| EP | 3 124 700 | A1 | 2/2017 | |
| EP | 3162960 | B1 * | 4/2018 | ............... E01F 7/04 |
| FR | 2956714 | A1 * | 8/2011 | ............. E01F 7/045 |
| JP | 2001114113 | A | 4/2001 | |
| JP | 2015183474 | A | 10/2015 | |
| RU | 81897 | U1 | 4/2009 | |
| WO | 2009/137951 | A1 | 11/2009 | |
| WO | 2014/202612 | A2 | 12/2014 | |

OTHER PUBLICATIONS

Canadian Examination Report dated Mar. 2, 2021, issued in corresponding Canadian Patent Application No. 3,070,722.

Japanese Examination Report dated Feb. 16, 2021, issued in corresponding Japanese Patent Application No. 2020-502640 (and English Machine Translation).

Indian Examination Report dated Mar. 30, 2021, issued in corresponding Indian Patent Application No. 202017002119 (and English Machine Translation).

Korean Examination Report dated Mar. 22, 2021, issued in corresponding Korean Patent Application No. 10-2020-7004966 (and English Machine Translation).

Search Report dated Jul. 4, 2018 issued in corresponding DE patent application No. 10 2017 116 531.2 (and partial English translation).

International Search Report dated Jan. 23, 2019 issued in corresponding International Patent Application No. PCT/EP2018/069667.

International Preliminary Report on Patentability dated Jan. 21, 2020 issued in corresponding International Patent Application No. PCT/EP2018/069667.

Examination Report dated Nov. 9, 2020 issued in corresponding AU patent application No. 2018303672.

Examination Report dated Oct. 20, 2020 issued in corresponding RU patent application No. 2020 106 760 (and partial machine translation).

Examination Report dated Dec. 1, 2020 issued in corresponding CL patent application No. 134-2020 (and partial machine translation).

Examination Report dated Dec. 24, 2020 issued in corresponding CN patent application No. 201880048892.9 (and partial machine translation).

2nd Examination Report dated Jun. 3, 2021, issued in corresponding CN Patent Application No. 201880048892.9 ( and English translation).

* cited by examiner

ENERGY ABSORPTION DEVICE

CROSS REFERENCE TO RELATED APPLICATIONS

This application is a U.S. national stage application of PCT/EP2018/069667 filed on Jul. 17, 2018, which is based on German Patent Application No. 10 2017 116 531.2 filed on Jul. 21, 2017, the contents of which are incorporated herein by reference.

STATE OF THE ART

The invention relates to an energy absorption device for safety nets and/or for rope constructions according to claim 1.

From EP 2 274 353 B1 a device for shock absorption by rope constructions is known.

The objective of the invention is in particular to provide a generic device with improved characteristics regarding its construction. Moreover, one objective of the invention is in particular to achieve a high level of cost efficiency. Furthermore one objective of the invention is in particular to achieve advantageous characteristics regarding a braking behavior. The objective is obtained, according to the invention, by the features of patent claim 1 while advantageous implementations and further developments of the invention will become apparent from the subclaims.

ADVANTAGES OF THE INVENTION

The invention relates to an energy absorption device for safety nets and/or for rope constructions, in particular an impact damping device and/or a shock damping device and/or a traction rope brake device, with a brake unit which comprises at least one deflection element and at least one brake element extending at least section-wise around the deflection element and which is configured for an at least partial absorption and/or conversion of kinetic energy in at least one load case, in particular an impact case, and with a connection unit, which is configured for a fixation of the brake unit in at least one location of use.

The implementation according to the invention allows providing an energy absorption device with an advantageous structure and/or construction. It is in particular possible to achieve a high level of cost efficiency, in particular due to a reduced diversity of parts. Moreover, a compact construction is advantageously achievable without eccentricity, in particular without eccentricity of a deflection region. It is furthermore possible to provide an energy absorption device with an advantageous braking behavior. In particular, it is possible for an impact energy occurring in the load case to be received in a continuous manner. Advantageously a linear response behavior and/or a constant response force are/is achievable in the load case, wherein especially advantageously an occurrence of force peaks is avoidable, at least to a large extent. Beyond this it is possible for a brake element to be advantageously controlled and/or deflected with low vibration and/or pulled around the deflection element.

The energy absorption device is in particular embodied as a net and/or rope construction brake and/or as a U-brake, preferably a U-brake for net and/or rope constructions. While ropes may in this context be in particular wire ropes, ropes made of other materials are also conceivable. Safety nets may herein in particular be wire nettings, while any other nets are also conceivable. The energy absorption device may be configured, for example, for a connection to ropes, in particular ropes extending transversely to a slope, e.g. suspension ropes and/or brake ropes and/or U-brake ropes and/or retention ropes. Advantageously respectively at least two, in particular identical, energy absorption devices are arranged on ends of a respective rope, and are preferably connected to a ground and/or to carrier elements or the like. In particular, the brake unit is configured to convert an impact energy, e.g. in case of a stone impact in a rockfall net installation comprising the energy absorption device, in case of an avalanche discharge, in case of a vehicle part impact or wreckage part impact in a safety fence, e.g. a racecourse protection fence, a road protection fence, a rail-track protection fence or the like, into deformation energy, advantageously by pulling the brake element around the deflection element. Advantageously the brake element is guided around the deflection element in a U-shape. Especially advantageously there is a traction load on the brake element in the load case, in particular in such a way that the brake element is pulled around the deflection element and is herein preferably deformed. Principally however a pressure load and/or a torsion load and/or a combination of different forces are/is also conceivable. "Configured" is in particular to mean specifically designed and/or equipped. By an object being configured for a certain function is in particular to be understood that the object fulfills and/or carries out said certain function in at least one application state and/or operation state.

Advantageously the deflection element is embodied to be gudgeon-like and/or bolt-like and/or at least substantially cylinder-shaped and/or hollow-cylinder-shaped. Preferentially the brake element is laid around the deflection element in such a way that an inner curvature radius of the brake element corresponds at least substantially to an outer radius of the deflection element. The brake unit is preferably implemented in such a way that in the load case only the brake element is deformed and in particular the brake element is not deformed, in particular at least not to a substantial extent. Advantageously the brake element is embodied to be ribbon-shaped. In particular, the brake element is embodied as a ribbon. Preferably the brake element is embodied in a one-part implementation and comprises at least one, in particular one-part, ribbon element. It is conceivable that the brake element consists of a plurality of ribbon elements, which are in particular adjacent to one another and which may, for example, be embodied identically to one another or differently from one another. While the brake element may have any length, lengths of, for example, 1 m or 2 m or 3 m or 4 m or 5 m are deemed to be expedient. However, lengths which are smaller or greater, in particular substantially smaller or greater, are also conceivable, in particular depending on a purpose of use of the energy absorption device. Advantageously a longitudinal axis of the deflection element is arranged at least substantially perpendicularly to a longitudinal axis of the brake element.

It is principally conceivable that the brake unit comprises a plurality of deflection elements, which may in particular be embodied identically or differently. The deflection elements may herein be arranged in such a way that their arrangement defines a deflection trajectory for the brake element, which may be realized in particular in a circular-arc shape but also with any other kind of curvature, e.g. elliptically curved. Moreover the deflection elements may differ from each other, in particular depending on their position, in regard to a diameter and/or a surface characteristic and/or a cross section. A usage of a plurality of deflection elements in particular permits a precise adjustment of a braking behavior and/or of a force characteristic of the brake unit. It is also conceivable that a deflection element has a cross section that differs from a cylinder. For example, a deflection element may have a cross section defining a deflection trajectory that is composed of different curved and/or straight partial trajectories. It is for example conceivable that, in a circulation around the deflection element, a curvature of the brake element first increases and in particular then decreases. The brake element may then have, for example, a principal curvature with a principal curvature radius as well as sections which are adjacent to said principal curvature, having a smaller curvature and tapering off from the principal curvature.

It is further conceivable that, in particular for the purpose of a selective adjustment of friction characteristics, the deflection element has a coating and/or a surface structuring or the like, e.g. a coating for reducing a friction between the deflection element and the brake element in the load case or, for example, nubs and/or ribs and/or grooves or the like, wherein it is in this case in particular conceivable that the deflection element is supported, freely rotatably, in such a way that it co-rotates in accordance with the movement of the brake element past the deflection element.

Especially advantageously the brake element extends around the deflection element in such a way that a first, in particular shorter, partial section of the brake element is arranged on a first side of the deflection element and a second, in particular longer, partial section of the brake element is arranged on a second, in particular opposite-situated, side of the deflection element. Preferentially the first partial section and the second partial section extend in parallel to one another, in particular spaced apart from one another, advantageously at a distance that corresponds at least substantially to a diameter of the deflection element. Advantageously the second partial section is at least twice as long, especially advantageously at least five times as long and preferably at least ten times as long as the first partial section. The brake element in particular comprises at least one connection section, which in particular is bent and extends around the deflection element and which connects the first partial section with the second partial section. Advantageously, in a load case a tension force acts on the first partial section in such a way that the first partial section is lengthened, with the second partial section being shortened and the brake element being pulled around the deflection element. Herein, during a pulling-through of the brake element, a certain section of the second partial section is in particular at first converted into the connection section and then becomes part of the first partial section. In particular, on the brake element, in particular on the first partial section, at least one connection element, in particular a shackle, is fixated which is configured for a connection with a rope that is to be braked. In particular, the longitudinal axis of the brake element is arranged at least substantially perpendicularly to a main extension direction of the brake element, in particular of the second partial section. By a "main extension direction" of an object is herein in particular a direction to be understood that extends in parallel to a longest edge of a smallest imaginary rectangular cuboid just still enclosing the object. "At least substantially perpendicularly" is here in particular to mean an orientation of a direction relative to a reference direction, in particular in a reference plane, the direction and the reference direction including an angle that differs from a right angle in particular by less than 8°, advantageously by less than 5° and especially advantageously by less than 2°. By "at least substantially" is in particular to be understood, in this context, that a deviation from a given value is equivalent to in particular less than 15%, preferably less than 10% and particularly preferably less than 5% of the given value. By an "at least substantially cylinder-shaped/hollow-cylinder-shaped" object is herein in particular an object to be understood for which a volume difference of the object and of a smallest cylinder/hollow cylinder encompassing and/or enclosing the object is maximally 30%, advantageously no more than 20%, especially advantageously no more than 10% and preferably maximally 5% of the volume of the cylinder/hollow cylinder.

The brake unit is advantageously configured to receive forces of at least 20 kN, advantageously at least 30 kN and especially advantageously at least 50 kN, preferably at least 80 kN and particularly preferably at least 100 kN or also at least 120 kN, in particular without a tearing of the brake element. In particular, an acting force is herein received with a deformation of the brake element, wherein preferentially, during a deformation process of the brake element, a counter force generated due to the deformation of the brake element firstly increases, in particular linearly, and then preferably seeks to achieve an at least substantially constant value. The brake unit is in particular configured to maintain the constant value of the counter force in the load case for a time period of at least 0.1 s, advantageously at least 0.2 s, especially advantageously at least 0.5 s and preferably at least 0.8 s. The time period is predeterminable in particular by a suitable selection of a length and/or a thickness and/or a cross section and/or generally a geometry of the brake element. Of course longer or considerably longer time periods are here also conceivable, which are achievable, for example, by using very long brake elements. In the load case the length of the time period of course also depends on an impact energy. By an "at least substantially constant value" is in particular, in this context, a value to be understood that varies by maximally 20%, advantageously by no more than 15%, especially advantageously by maximally 10% and preferentially by no more than 5%.

Advantageously the brake unit comprises at least one housing element. The housing element preferably implements at least a portion of the connection unit. The connection unit advantageously comprises at least one connection element, in particular a shackle, which is configured for a connection to a fixation rope, a fixation nail, an anchoring, a carrier or the like. The connection element is advantageously fixated on the housing element. In particular, the connection unit is configured to fixate the housing element, and in particular the energy absorption device, stationarily in the location of use, in particular an installation location of the safety net. The energy absorption device may herein be anchored on a ground but may as well be, for example, integrated in a net installation, possibly on a steel beam. The deflection element is advantageously, in the load case, stationary relative to the connection unit, in particular to the connection element. Especially advantageously the fixation element moves in the load case relative to the deflection element, in particular away from the deflection element, and/or relative to the joining element, in particular away from the joining element, advantageously along a longitudinal axis of the brake element and/or perpendicularly to a longitudinal axis of the deflection element.

In an advantageous implementation of the invention it is proposed that the connection unit is embodied at least partly in a one-part implementation with the deflection element. Advantageously the connection unit comprises the deflection element. In particular, the connection element comprises the deflection element. Preferentially the deflection element realizes a fixation of the connection element on the housing element. The connection element advantageously has a higher load capacity, in particular a higher traction-load capacity, than the joining element. In this way a high level of load capacity is achievable. It is moreover possible to provide an energy absorption device with a compact construction, in particular of a deflection region.

In a particularly advantageous implementation of the invention it is proposed that the connection unit comprises at least one shackle with at least one bolt, which is embodied at least partly in a one-part implementation with the deflection element. Preferentially the shackle is embodied as a wide-mouth shackle. In particular, the shackle has a bearing strength of at least 2 t, advantageously at least 5 t and especially advantageously at least 8.5 t. Preferably the bolt of the shackle is secured against unscrewing and/or unturning, in particular by means of at least one securing cotter pin, preferably in a combination with at least one nut. The housing preferably has at least one pass-through, which the bolt goes through. In particular, the connection element is the shackle. Preferably the deflection element is the bolt of the shackle. Advantageously the connection element implements the connection unit as well as the deflection element. Advantageously the connection element and the joining element are each embodied as a shackle, wherein preferentially the connection element is embodied as a larger shackle and the joining element is embodied as a smaller shackle. A vice-versa realisation is also conceivable. This advantageously allows achieving a compact construction of components without eccentricities, which differ from the brake element. Furthermore a high level of reliabilty and/or a reduced diversity of parts are/is achievable.

It is also proposed that the housing element encompasses the brake element and the deflection element at least partly. Preferentially the housing element encompasses the brake element in a deflection region around the deflection element. The housing element is in particular embodied as a piece of pipe. In particular, the first partial section and the second partial section of the brake element protrude from the housing on a side of the housing that faces away from the connection element. Advantageously the housing element is open toward the connection element and toward ends of the brake element.

Preferably, in a view along the longitudinal axis of the brake element, in particular along a longitudinal axis of the first partial section and/or along a longitudinal axis of the second partial section, the housing element encompasses the brake element, in particular the first partial section and the second partial section of the brake element, completely. This advantageously allows securing a deflection region against soiling and in particular against blocking. Moreover a high level of robustness is achievable.

The brake element comprises at least one first brake portion and at least one second brake portion, the brake portions differing from one another at least in regard to local load capacities. The local load capacity may herein be, for example, a local tensile-load capacity, a flexural rigidity, a pressure resistance, a torsion resistance, a hardness, a melting temperature, a phase transition temperature, or the like. It is conceivable that the local load capacity of the brake element changes continuously at least over a certain portion of the brake element. A discontinuous change is also conceivable. Beyond this a plurality of different brake portions are conceivable having different local load capacities. Herein both continuous and discontinuous transitions are respectively conceivable between such brake portions. The first brake portion and the second brake portion may herein differ regarding at least one microscopic property, e.g. a grain size and/or an alloy composition and/or a texture, as well as regarding at least one macroscopic property, e.g. a geometry, in particular a material thickness, a cross section, a structure of individual ribbon elements or the like, regarding a material or regarding any other properties. Preferentially in the load case at first the first brake portion is pulled around the deflection element, before the second brake portion is pulled around the deflection element. In this way a high flexibility regarding an adaptability of a brake characteristic curve is achievable. It is moreover possible, in a braking process, to achieve a start-up at a lower traction-force level.

In an advantageous implementation of the invention it is proposed that the first brake portion has a lower local load capacity, preferably a smaller rigidity, over a smaller flexural moment of inertia than the second brake portion. Advantageously, in particular in an original state prior to the load case, in which the energy absorption device is, for example, assembled and installed according to its intended use, the first brake portion is arranged closer to the deflection element than the second brake portion. In particular, the first brake portion is in the original state arranged in a proximity of the deflection element. The brake unit is in particular configured, in the load case, to receive a smaller force during start-up than after start-up. Preferentially brake portions of different local load capacities are implemented in such a way that in an impact case, e.g. of a test weight, e.g. of several tons from a certain height, e.g. several meters, the brake unit shows a force characteristic curve comprising a continuous increase as well as a platform following thereon, which is in particular free of force peaks, preferably a platform of a constant force. This advantageously allows achieving a high reliability in the anchoring, in particular as uncontrolled damages of an energy absorption device, caused by the occurrence of load peaks, are avoidable.

In an especially advantageous implementation of the invention it is proposed that, in particular in the original state, the first brake portion extends at least section-wise around the deflection element. Preferably, in particular in the original state, the first brake portion forms the joining portion. This advantageously allows providing an energy absorption device starting up in a controlled manner.

The first brake portion comprises at least one material recess, in particular a hole, advantageously an oblong hole or at least one longitudinal groove. This advantageously allows in particular achieving a cost-efficient manufacturability and/or a high flexibility regarding an adaption of brake characteristics. Preferentially a longitudinal axis of the material recess extends at least substantially in parallel to the longitudinal axis of the brake element. In particular, the material recess has a width, in particular perpendicularly to the longitudinal axis of the material recess, that is equivalent to at least 30%, advantageously at least 40%, particularly advantageously at least 60% and preferably at least 70% of a width of the brake element, in particular of the first brake portion. It is conceivable that the material recesses have a changing cross section along the longitudinal axis of the brake element. Advantageously the material recess may, for example, taper from the first brake portion towards the second brake portion, in particular continuously. In particular regarding a simple manufacturability, it is however also conceivable that the material recess has a constant width, at least section-wise. In particular if the material recess is embodied as an oblong hole, it may have rounded front sides.

A high load capacity, advantageously in combination with low material and/or production costs, is in particular achievable if the brake element is embodied as a one-part metal ribbon, in particular as a steel ribbon. Preferably the brake element is a flat steel ribbon, having for example a rectangular cross section. Herein, for example, a width of the brake element may be 60 mm and a thickness may be 8 mm, while any other values are also conceivable, in particular depending on a desired load capacity and/or a desired braking behavior. In particular if comparably small forces are expected to occur, a thickness of the brake element is in particular at least 2 mm, advantageously at least 3 mm and especially advantageously at least 4 mm, and/or at most 8 mm, advantageously at most 7 mm and especially advantageously at most 6 mm. Moreover, in particular if comparably great forces are expected to occur, a thickness of the brake element is in particular at least 4 mm, advantageously at least 5 mm and especially advantageously at least 6 mm and/or maximally 12 mm, advantageously maximally 10 mm and especially advantageously maximally 9 mm. A width of the brake element may in particular be at least 20 mm, advantageously at least 30 mm and especially advantageously at least 40 mm and/or maximally 120 mm, advantageously maximally 100 mm and especially advantageously maximally 80 mm. Preferably a width of the brake element is between 45 mm and 60 mm. Furthermore a thickness of the brake element is preferably between 5 mm and 12 mm. Of course utilization of other metals is conceivable. In particular corrosion-resistant materials and/or material combinations may be considered for the brake element. For example, a stainless steel ribbon is also conceivable. The brake element may moreover be provided with a corrosion-protection coating, at least section-wise.

Beyond this, in particular for the purpose of attaining a high degree of compactness, it is conceivable that the brake element is at least section-wise rolled-up and/or wound-up, in particular around a winding axis that is arranged at least substantially in parallel to the longitudinal axis of the deflection element. For example, the brake element may section-wise be rolled into a spiral. In particular, at least a portion of the second partial section of the brake element is rolled-up and/or wound-up. In this way it is advantageously possible that even an energy absorption device that has a brake element with a length of several meters is installed and/or is integrated in a safety net installation without requiring much space, in particular in case of an installation on a carrier or the like above ground.

In another implementation of the invention it is proposed that the housing element is realized in a one-part implementation. Advantageously the housing has a constant cross section. In particular the housing element is embodied as a one-part tube piece, in particular a steel tube, preferably an angular tube. In this way a high degree of robustness is achievable. Utilization of a tube piece is moreover cost-efficient, in particular as the housing is producible by simple cutting to length and in particular by an easily implementable transverse bore.

In an advantageous implementation of the invention it is proposed that the housing element is configured at least partly for a guiding of the brake element in the load case. In particular, in the load case an underside of the brake element, in particular of the second partial section, extends along at least one inner edge and/or inner surface of the housing. The inner edge is herein advantageously arranged on the side of the housing element that faces away from the connection element. A main extension plane of the inner surface is advantageously arranged at least substantially in parallel to a main extension plane of the brake element, in particular of the first partial section and/or of the second partial section.

It is further proposed that the deflection element is supported in such a way that it is rotatable relative to the housing element, in particular by at least 45°, advantageously by at least 90°, especially advantageously by at least 120°. It is possible that the deflection element is supported in such a way that it is completely freely rotatable. In particular in a case of the deflection element being a bolt of a shackle, it is also conceivable that at least one abutment of the shackle, in particular an abutment of the shackle on the housing, in particular two abutments on opposite sides of the housing, defines/define a maximum rotation angle of the deflection element. It is conceivable that the deflection element is rotatable against an, in particular adjustable, force. For example, the deflection element may be partially tightened against the housing by at least one screw and/or nut or the like. In this way it is possible to achieve an even start-up in a load case. Moreover, uncontrolled damaging of the brake unit is avoidable.

It is also proposed that the brake unit comprises at least one guiding element, which is movable relative to the deflection element and is configured for an at least partial guiding of the brake element. Preferably the guiding element is fixated on the first partial section. In particular the guiding element is fixated on the brake element by means of the joining element. Preferentially, the guiding element is in the load case moved along the brake element together with the joining element. Preferably the guiding element moves in the load case away from the housing element, in particular along the longitudinal axis of the brake element. The guiding element advantageously defines a maximum distance, in particular in a direction that is perpendicular to a main extension plane of the brake element, in particular of the first partial section and/or of the second partial section, between the first partial section and the second partial section. Preferentially the guiding element is embodied as a piece of tube, in particular a piece of angular tube, preferably made of steel. It is conceivable that a cross section of the guiding element is equivalent to a cross section of the housing element, wherein differing cross sections are also conceivable. Advantageously a cross section of the guiding element is greater than a cross section of the housing element. There is also the possibility of coupling the guiding element on one side to a rope, in particular a suspension rope. In particular, the guiding element may in this case comprise a rope guidance, via which it is guidable along the rope. This advantageously allows in the load case avoiding uncontrolled movement, in particular uncontrolled slamming, of the brake element, which would result in force peaks, in particular during a pulling-through of the brake element.

Advantageous properties regarding an adaption of a braking characteristic, for example in different points of a safety net, in different locations of use and/or depending on a load that is to be expected, are in particular achievable with a construction kit for a production of an energy absorption device according to the invention, comprising a connection unit and at least two brake units which have different braking characteristics and each of which is connectable with the connection unit. In particular, the construction kit comprises at least two different brake elements which may differ, for example, regarding a presence or a geometry of a material recess, regarding a material, regarding a geometry, regarding a material thickness, or the like. It is also conceivable that the brake units differ regarding a deflection behavior. For example, said brake elements may comprise differing deflection elements, in particular deflection elements with different diameters and/or with different surface structures, and/or may comprise different numbers and/or arrangements of deflection elements.

A high degree of safety and/or an advantageous behavior in an impact case are/is in particular achievable with a net and/or rope construction, in particular a safety net, having at least one energy absorption device according to the invention. Preferably the net and/or rope construction is a wire net and/or wire rope construction. The net and/or rope construction may be, for example, a rockfall protection installation, a motorsport fence, a catch barrier, a road and/or rail track protection net, an avalanche netting, a projectile-catch fence, a vehicle catching barrier, in particular an airplane catching barrier installation, a test track protection net, or the like. The energy absorption device is advantageously applicable in the net and/or rope construction as a brake, in particular a U-brake. Preferably the net and/or rope construction comprises a plurality of energy absorption devices, at least some of which are in particular respectively connected to one another via traction ropes, in particular wire ropes. Principally moreover a parallel arrangement and/or a series arrangement of a plurality of, e.g. two or three or four or even more, energy absorption devices is conceivable. Herein it is conceivable that parallel-arranged and/or in-series-arranged energy absorption devices are embodied at least substantially identically to one another. It is also conceivable that parallel-arranged and/or in-series-arranged energy absorption devices are embodied differently and are in particular configured to generate different brake forces. This allows, for example, a precise and/or application-specific adaption of a total braking characteristic by a suitable connection of a plurality of energy absorption devices.

The invention furthermore comprises a method for a production of an energy absorption device according to the invention, in particular by means of a construction kit according to the invention, wherein advantageously at least one brake unit is connected with at least one connection unit. It is herein of course conceivable that the brake unit and/or the connection unit are/is completed only with a joining of the two units.

The energy absorption device according to the invention is herein not to be restricted to the application and implementation described above. In particular, to fulfill a functionality that is described here, the energy absorption device according to the invention may comprise a number of individual elements, structural components and units that differs from a number mentioned here, and/or may comprise any expedient combination thereof. Moreover, regarding the value ranges given in this disclosure, values within the given limits are also to be considered to be disclosed and to be usable according to requirements.

DRAWINGS

Further advantages may be gathered from the following description of the drawings. In the drawings an exemplary embodiment of the invention is shown. The drawings, the description and the claims contain a plurality of features in combination. Someone skilled in the art will purposefully also consider the features individually and will find further expedient combinations.

Figure 2:
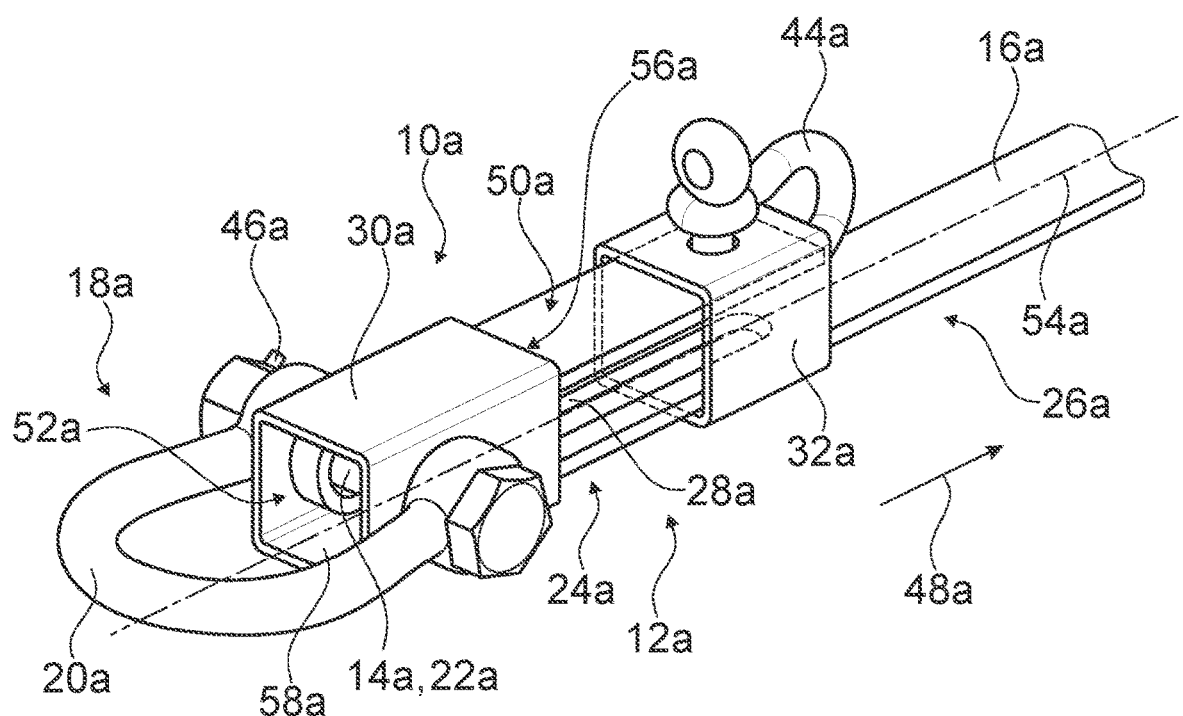
Figure 3:
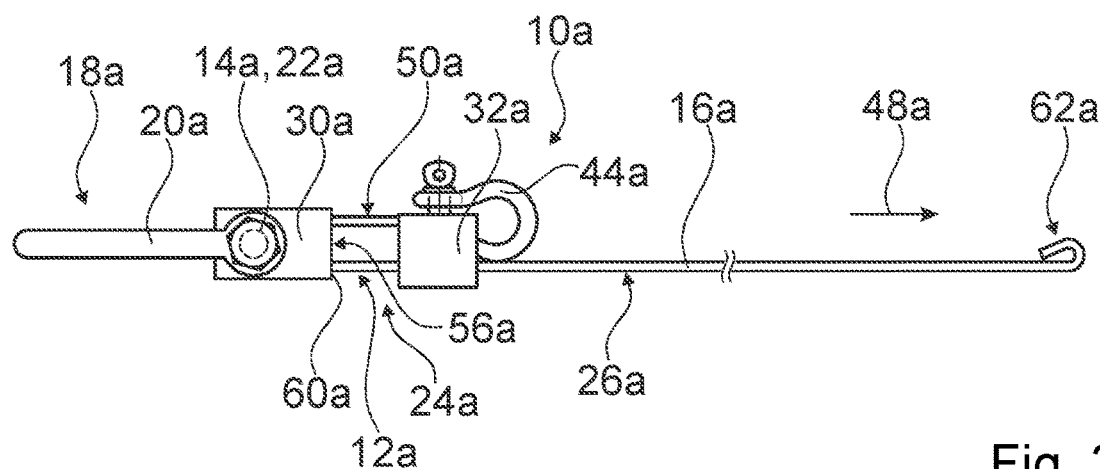
Figure 4:
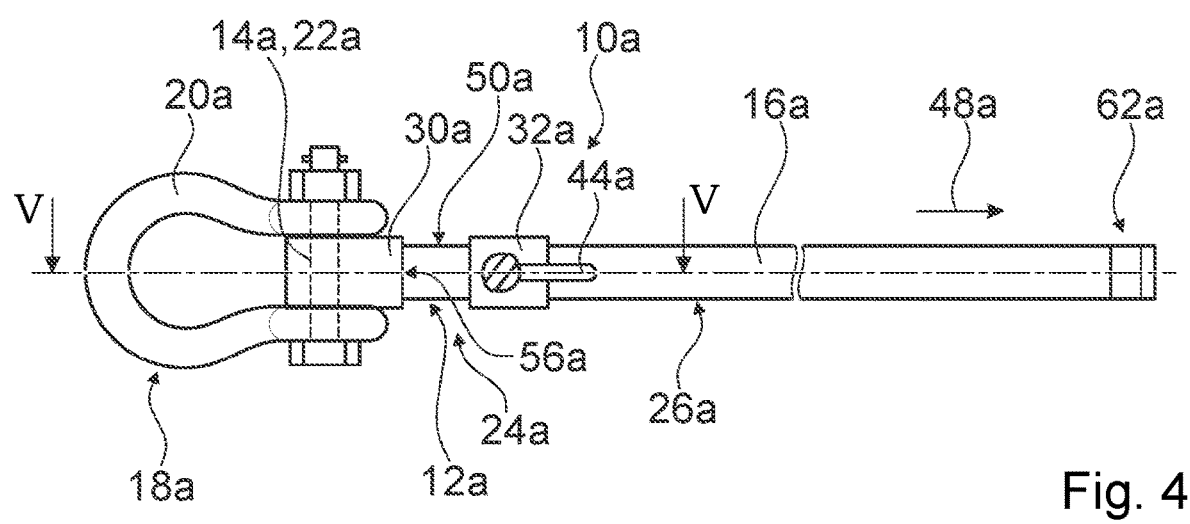
Figure 5:
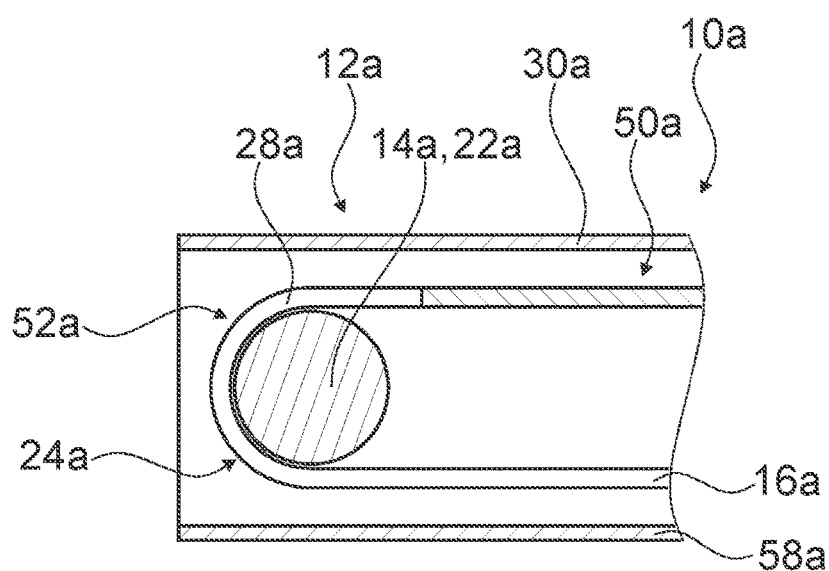
Figure 6:
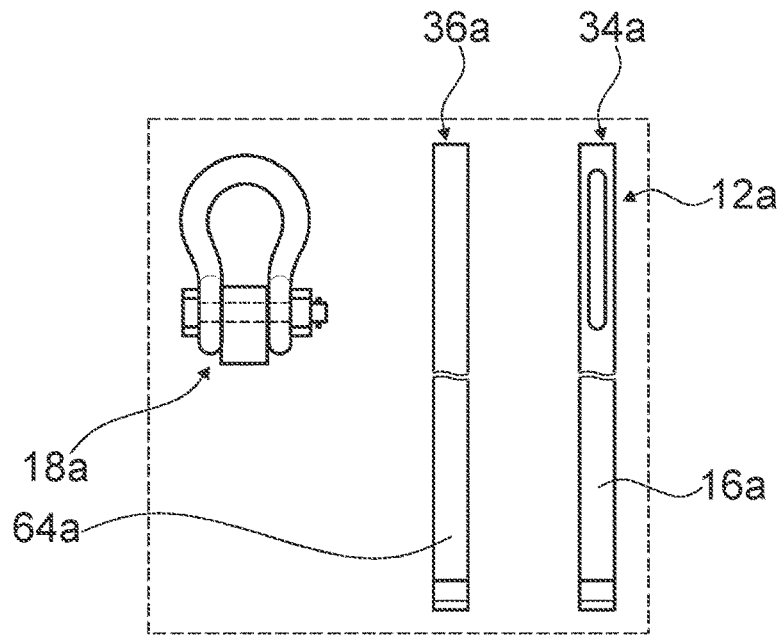
Figure 7:
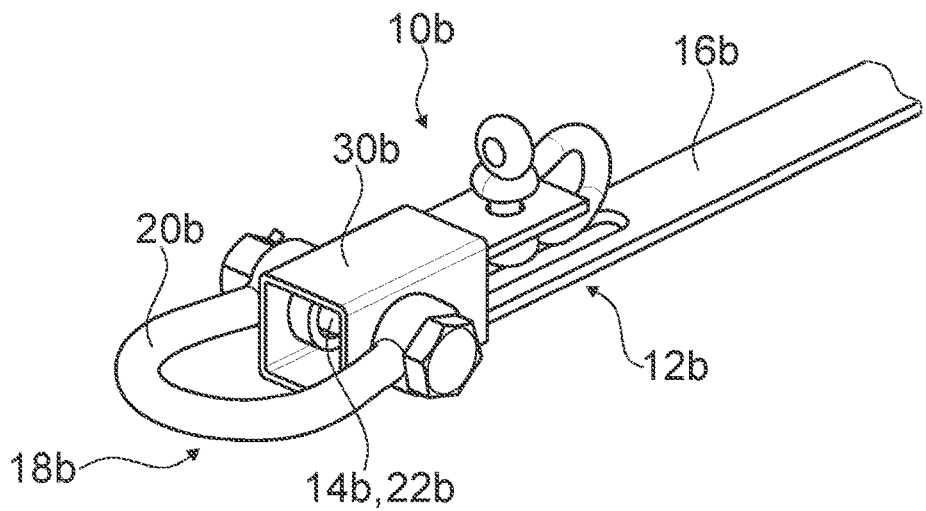
Figure 8:
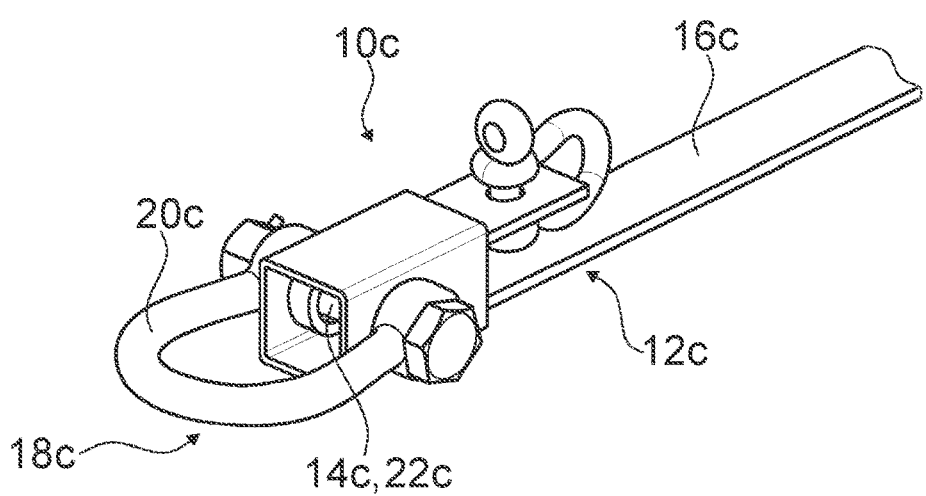
Figure 9:
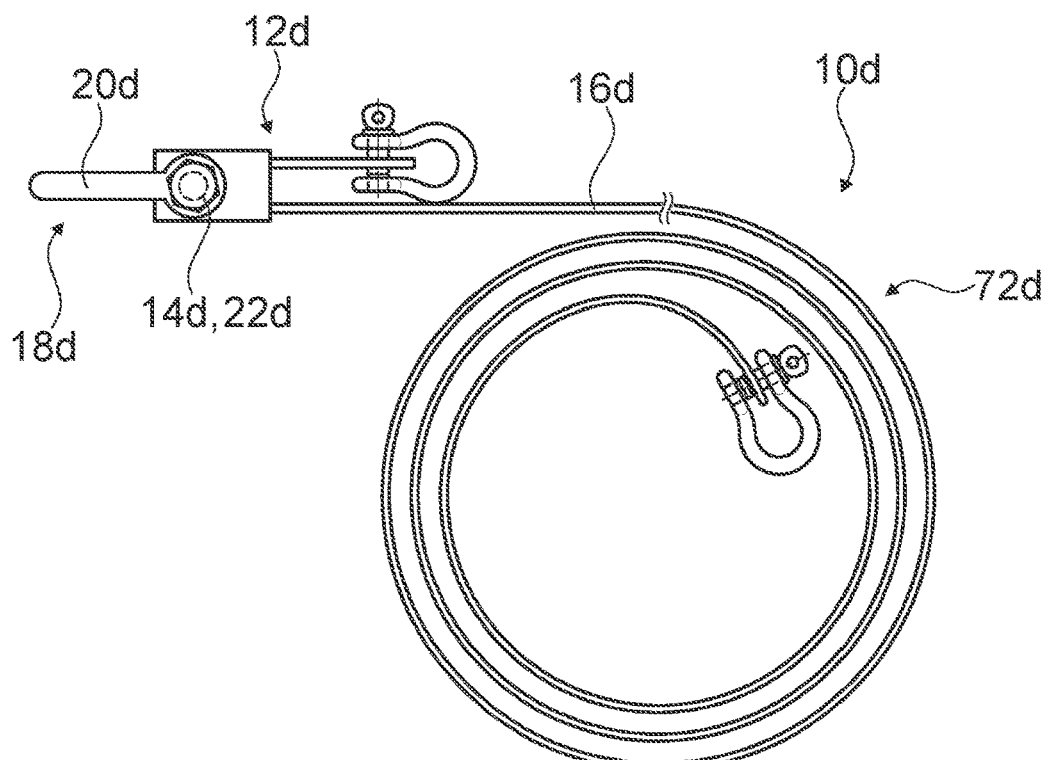
Figure 10:
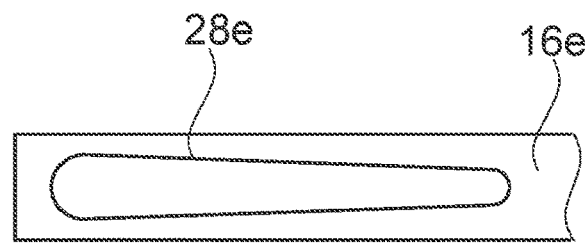
Figure 11:
Figure 12:
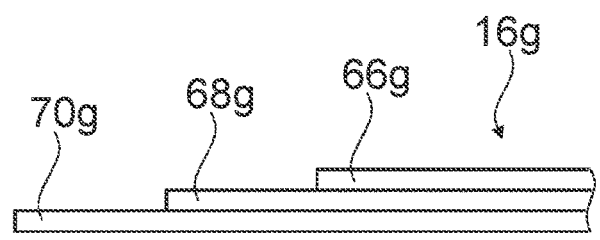
Figure 13:
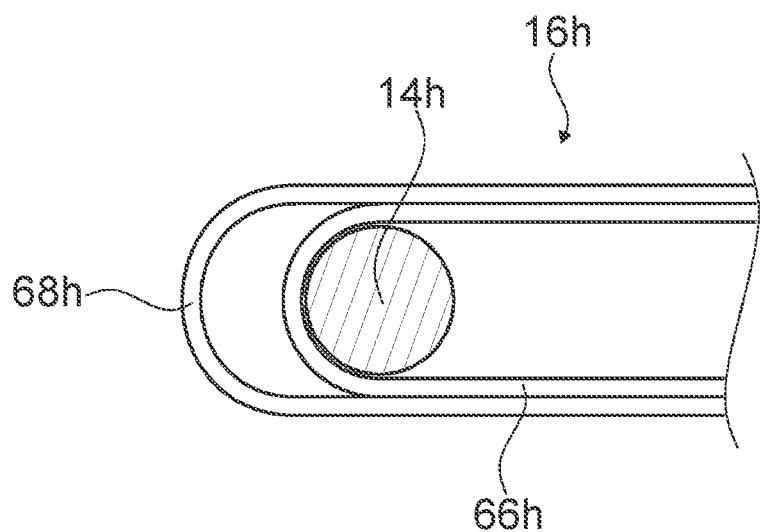

It is shown in:

FIG. 1 a net and/or rope construction with an energy absorption device in a schematic representation, FIG. 2 the energy absorption device in a schematic perspective view, FIG. 3 the energy absorption device in a schematic side view, FIG. 4 the energy absorption device in a schematic top view FIG. 5 a portion of the energy absorption device in a schematic sectional view along section line V-V of FIG. 4, FIG. 6 a construction kit for producing an energy absorption device in a schematic representation, FIG. 7 a first alternative energy absorption device in a schematic perspective view, FIG. 8 a second alternative energy absorption device in a schematic perspective view, FIG. 9 a third alternative energy absorption device in a schematic perspective view, FIG. 10 a first alternative brake element in a schematic representation, FIG. 11 a second alternative brake element in a schematic representation, FIG. 12 a third alternative brake element in a schematic representation, and FIG. 13 a fourth alternative brake element in a schematic representation.

DESCRIPTION OF THE EXEMPLARY EMBODIMENTS

FIG. 1 shows a net and/or rope construction 38a in a schematic representation. The net and/or rope construction 38a is embodied as a rockfall protection installation. The net and/or rope construction 38a could however, as mentioned above, also be embodied as a motorsport protective net, an avalanche barrier, a test track protective barrier, a projectile barrier net or the like. The net and/or rope construction 38a is in the present case installed in a location of use 40a, e.g. on a mountain slope. The net and/or rope construction 38a comprises at least one energy absorption device 10a. In the present case the energy absorption device 10a is used as a brake, in particular as a U-brake. The energy absorption device 10a may, for example, be integrated in the net and/or rope construction 38a via at least one traction rope 42a. In particular, respectively two energy absorption devices 10a are connected to one another via at least one traction rope 42a, in particular a suspension rope. Energy absorption devices 10a may herein be fixated and/or installed on a ground, alternatively or additionally, however, for example on carriers of the net and/or rope construction 38a.

FIG. 2 shows the energy absorption device 10a in a schematic perspective view. FIG. 3 shows the energy absorption device 10a in a schematic side view. FIG. 4 shows the energy absorption device 10a in a schematic top view. FIG. 5 shows a portion of the energy absorption device 10a in a schematic sectional view along section line V-V of FIG. 4. The energy absorption device 10a is in the present case configured for a usage as a brake, in particular a U-brake for safety nets and/or rope constructions. In particular the energy absorption device 10a is a net and/or rope construction brake. In particular the energy absorption device 10a is an impact damping device and/or a shock damping device and/or a traction rope brake device. The energy absorption device 10a comprises a brake unit 12a. The brake unit 12a comprises at least one deflection element 14a. Furthermore the brake unit 12a comprises at least one brake element 16a extending at least section-wise around the deflection element 14a. The brake unit 12a is configured for an at least partial absorption and/or conversion of kinetic energy in at least one load case, in particular an impact case, e.g. in case of a rockfall into the net and/or rope construction 38a. The energy absorption device 10a further comprises a connection unit 18a, which is configured for a fixation of the brake unit 12a in the location of use 40a.

The brake element 16a is in the present case laid around the deflection element 14a in a U-shape fashion. The deflection element 14a is embodied to be cylinder-shaped, in particular circular-cylinder-shaped. In particular the deflection element 14a has an at least substantially circle-shaped cross section. In the load case kinetic energy is converted into deformation energy of the brake element 16a. The brake element 16a is in the load case pulled around the deflection element 14a and is herewith deformed. A net portion of the net and/or rope construction 38a can therefore in the impact case carry out a compensatory movement and can, for example, partially give way to an impacting piece of rock, as a result of which said piece of rock is braked in a less abrupt manner than in case of a direct connection of a suspension rope to a fixation point, e.g. an anchoring in the ground.

The brake unit 12a comprises a joining element 44a, which is configured for a connection with an element that is to be braked, in particular a traction rope 42a, e.g. a wire rope. The joining element 44a is connected to the brake element 16a. In the load case the brake element 16a is pulled around the deflection element 14a due to a traction force acting onto the joining element 44a. The joining element 44a is in the present case implemented as a shackle. To give an example, the joining element 44a may be embodied as a ¾" shackle. However, depending on a size and/or load capacity and/or intended use of the energy absorption device 10a, other joining elements, in particular shackles of other sizes, are conceivable. Preferably the joining element 44a is manufactured from steel.

The energy absorption device 10a has in the present case a weight of approximately 17.5 kg. The energy absorption device 10a furthermore has a length of approximately 3 m. The brake unit 12a is configured to receive forces of approximately 80 kN without a tearing of the brake element 16a. In particular the brake unit 12a exerts in the load case a brake force against an impacting object, which firstly increases and then has, advantageously without an occurrence of force peaks, more or less a constant value of, for example, 80 kN while the brake element 16a is being pulled around the deflection element 14a. Preferably the brake unit 12a has a force-peak-free characteristic curve. The brake unit 12a in particular generates in the load case a counter force which increases at first, in particular linearly, and which, following a start-up phase of approximately 0.1 s to 0.2 s, seeks to achieve an at least substantially constant value, e.g. a value of 80 kN. The counterforce advantageously fluctuates around this value over a braking period of, for example, 0.5 s, advantageously by less than ±30 kN, especially advantageously by less than ±20 kN and preferably by less than ±10 kN. A length of the braking period is of course selectable according to almost any requirement, for example by using an appropriately long or short brake element 16a. Moreover, the length of the braking period in particular depends on a load case, for example of an impact intensity.

The connection unit 18a is realized at least partly in a one-part implementation with the deflection element 14a. The connection unit 18a is embodied at least partly in a one-part implementation with the brake unit 12a. The deflection element 14a is an element shared by the connection unit 18a and the brake unit 12a. The connection unit 18a comprises at least one shackle 20a with at least one bolt 22a, which is embodied at least partly integrally with the deflection element 14a. In the present case the bolt 22a implements the deflection element 14a. The shackle 20a of the connection unit 18a is in the present case a wide-mouth shackle. The shackle 20a of the connection unit 18a advantageously has a load-bearing capacity of approximately 8.5 t, wherein of course other values and/or shackle types are conceivable, depending on a load that is to be expected, on a build-in position, on an available installation space, on an installation position, and the like. Preferably the shackle 20a is made of steel. The shackle 20a comprises in the present case at least one securing cotter pin 46a, which secures fixation nuts against getting lost, for example due to an unscrewing in the load case.

Principally it is however also conceivable that a deflection element is implemented separately from a connection element of a connection unit. In particular, a connection unit may comprise at least one connection shackle that is arranged spaced apart from a deflection element. A corresponding deflection element could then be embodied, for example, as at least one bolt. Principally multi-part deflection elements and/or arrangements of deflection elements defining any deflection trajectories for a brake element are conceivable. Moreover, it is conceivable that a deflection element that differs from a bolt is integrally connected to a connection element, while the connection element may in its turn differ from a shackle. For example, a ring, a tube, a hook or the like may as well be used as a connection element.

The brake element 16a comprises at least one first brake portion 24a and at least one second brake portion 26a, which differ at least regarding their local load capacities. Advantageously the first brake portion 24a has a lower local load capacity than the second brake portion 26a. In the present case the first brake portion 24a has a smaller rigidity than the second brake portion 26a. A force required for a bending and/or pulling of the first brake portion 24a around the deflection element 14a is in particular smaller than a force respectively required for the second brake portion 26a. In particular, the first brake portion 24a is bendable, in particular bendable around a bending axis that is perpendicular to a main extension direction 48a of the brake element 16a, with less force effort than the second brake portion 24a. In the present case the first brake portion 24a merges into a joining portion 50a, which is arranged on a side 56a of the first brake portion 24a that faces away from the second brake portion 26a. The joining element 44a is fixated on the joining portion 50a. The joining portion 50a and the second brake portion 26a have in the present case at least substantially identical local load capacities.

The first brake portion 24a extends at least section-wise around the deflection element 14a. In the load case at first the first brake portion 24a is pulled around the deflection element 14a before the second brake portion 26a, which in particular directly follows the first brake portion 24a, is also pulled around the deflection element 14a. In the present case the first brake portion 24a forms a U-shaped bend 52a of the brake element 16a around the deflection element 14a. In the load case the brake element 16a starts up evenly due to the first brake portion 24a and a counter force is built up continuously, in particular in such a way as to avoid an occurrence of force peaks.

The first brake portion 24a comprises at least one material recess 28a. The material recess 28a is in the present case realized as an oblong hole. The second brake portion 26a is in the present case free of a material recess. In a proximity of the material recess 28a the brake element 16a has a reduced rigidity. The material recess 28a has in the present case a length of approximately 300 mm, while any other lengths are conceivable. Furthermore the material recess 28a has a width of approximately 30 mm, while any other values are conceivable in this regard as well. By a selection of a suitable width in particular a difference of the local load capacities of the first brake portion 24a and the second brake portion 26a is adjustable. Instead of an oblong hole, a deepening or the like is also conceivable. It is moreover conceivable that a plurality of material recesses are provided, for example parallel-arranged material recesses. It is also conceivable that the first brake portion 24a is at least partially produced from a different material than the second brake portion 26a, e.g. of a different alloy. It is also conceivable that the material recess 28a is at least partially filled-up, e.g. with a different metal and/or with a synthetic material and/or with a rubber. In the present case the material recess 28a is embodied as an oblong hole having parallel sides. However, any other geometries are conceivable, as is in particular shown in FIGS. 10 to 13. Furthermore the local load capacity changes in the present case rather discontinuously between the first brake portion 24a and the second brake portion 26a. Herein it is also conceivable that the local load capacity changes continuously, in particular by a linear increase, over a greater longitudinal section of the brake element 16a and/or completely. In particular, a start-up behavior of the brake unit 12a is adjustable via a modification of the local load capacity.

The brake element 16a is in the present case realized in a one-part implementation. Further the brake element 16a is embodied as a metal ribbon, in particular as a steel ribbon. The brake element 16a has in the present case a rectangular cross section. A cross section area of the brake element 16a is, for example, approximately 60 mm*8 mm, while any other dimensions are conceivable. A width of the brake element 16a is accordingly approximately 60 mm. Correspondingly a thickness of the brake element 16a is approximately 8 mm. In particular, the width and/or the material thickness of the brake element 16a are/is at least substantially constant along its longitudinal axis 54a. In particular, the longitudinal axis 54a of the brake element 16a is in the present case equivalent to a longitudinal axis of the second brake portion 26a. Further a length of the brake element 16a is in the present case approximately 3 m. Of course other dimensions are conceivable, in particular to achieve any other braking characteristic. It is moreover conceivable that at least a width and/or a thickness and/or a contour or the like of the brake element 16a change/changes along its longitudinal axis 54a.

The brake unit 12a comprises at least one housing element 30a. The housing element 30a is in the present case realized in a one-part implementation. The housing element 30a encompasses the brake element 16a and the deflection element 14a at least partially. The housing element 30a is implemented of steel. The housing element 30a is embodied as a piece of tube, in particular as a piece of angular tube and/or as a piece of steel tube. The shackle 20a of the connection unit 18a is fixated on the housing element 30a. The deflection element 14a goes transversely through the housing element 30a. In particular, the housing element 30a comprises pass-through guidances for the deflection element 14a, through which the deflection element 14a can be guided for its fixation. The brake element 16a enters the housing element 30a on an, in particular open, side 56a of the housing element 30a and leaves it after a circulation around the deflection element 14a. The bend 52a of the brake element 16a is arranged inside the housing element 30a.

In the present case the housing element 30a has a length, in particular a length parallel to the longitudinal axis 54a of the brake element 16a, of approximately 150 mm. Moreover the housing element 30a has a cross section, in particular perpendicularly to the longitudinal axis 54a of the brake element 16a, of approximately 80 mm*80 mm. The housing element 30a further has in the present case a material thickness of approximately 8 mm. In particular, a material thickness of the housing element 30a is greater than a material thickness of the brake element 16a. However, identical material thicknesses are also conceivable. It is furthermore conceivable that the housing element 30a has a smaller material thickness than the brake element 16a. Advantageously the brake element 16a is not directly adjacent to the housing element 30a but is arranged inside the housing element 30a with a certain clearance. Principally any other dimensions of the housing element 30a are conceivable, in particular in adaption to dimensions of the brake element 16a and/or of the deflection element 14a. It is beyond this conceivable that the housing element 30a has a considerably greater length, e.g. of 20 cm or 30 cm or 40 cm, and thus a longer portion of the brake element 16a is arranged inside the housing element 30a. Alternatively it is also conceivable that the housing element has a smaller, in particular significantly smaller, length.

The deflection element 14a is supported in such a way that it is rotatable relative to the housing element 30a. In particular, the deflection element 14a is rotatable at least so far that the shackle 20a of the connection unit 18a abuts on the housing element 30a and/or on the brake element 16a. It is alternatively also conceivable to fixate, e.g. weld, the deflection element 14a relative to the housing element 30a. It is also possible that the deflection element 14a is fixated on the housing element 30a in a rotationally fixed fashion by a tightening of at least one nut of the shackle 20a of the connection unit 18a.

The housing element 30a is in the load case configured at least partially for a guiding of the brake element 16a. Advantageously the housing element 30a prevents a sidewise slipping of the brake element 16a away from the deflection element 14a. In particular, the housing element 30a is configured to realize and/or safeguard a deflection of the brake element 16a around the deflection element 14a by at least 150°, advantageously by 180°. Furthermore, in the load case, in particular during a pulling-through of the brake element 16a, an inner surface 58a and an inner edge 60a of an open side 56a of the housing element 30a guide the brake element 16a, in particular the second brake portion 26a.

The brake unit 12a comprises at least one guiding element 32a, which is movable relative to the deflection element 14a and is configured for an at least partial guiding of the brake element 16a. In the present case the guiding element 32a is fixated on the joining portion 50a of the brake element 16a. In particular, the guiding element 32a is fixated on the brake element 16a by means of the joining element 44a. The brake element 16a goes, after its circulation around the deflection element 14a, through the guiding element 32a. In the load case the guiding element 32a is pulled along the brake element 16a, away from the housing element 30a. The brake element 16a is herein pulled, and is advantageously stabilized and/or guided, through an interior of the guiding element 32a. In the present case the guiding element 32a is embodied as a piece of tube, in particular a piece of steel tube and/or piece of angular tube. The guiding element 32a may, for example, have a cross section of approximately 100 mm*100 mm. Furthermore the guiding element 32a may have a thickness of approximately 6 mm. In particular, a material thickness of the guiding element 32a corresponds to the material thickness of the brake element 16a. In the present case the guiding element 32a has a different cross section than the housing element 30a. It is however also conceivable that the housing element 30a and the guiding element 32a have identical cross sections and are in particular pieces of a same tube.

Alternatively or additionally it is conceivable that the guiding element 32a is connected to at least one rope, in particular a suspension rope, of the net and/or rope construction 38a and/or is movable while guided along such a rope. Preferentially the guiding element 32a may in this case be configured to guide the brake element 16a parallel to the rope and/or to at least partly prevent a lashing-out of the brake element 16a relative to the rope.

The brake element 16a comprises a rear abutment 62a, which prevents a pulling-out of the brake element 16a from the housing element 30a. In the load case the brake element 16a is pulled around the deflection element 14a only until the abutment 62a is reached. In the present case the brake element 16a is folded back on a rear end to form the abutment 62a. An abutment may however also be realized by attaching an additional shackle and/or a screw and/or a bolt or the like.

FIG. 6 shows a construction kit 34a for a production of an energy absorption device 10a in a schematic illustration. The construction kit 34a comprises a connection unit 18a and two different brake units 12a, 36a which differ regarding their braking characteristics. In the present case the brake units 12a, 36a comprise different brake elements 16a, 64a.

For a production of the energy absorption device 10a, the connection unit 18a is, for example, connectable with one of the brake units 12a, 36a.

FIGS. 7 to 13 show seven further exemplary embodiments of the invention. The following description is essentially limited to the differences between the exemplary embodiments wherein, regarding structural components, features and functions that remain the same, the description of the exemplary embodiment of FIGS. 1 to 6 may be referred to. To distinguish the exemplary embodiments, the letter a in the reference numerals of FIGS. 1 to 6 has been substituted by the letters b to h in the reference numerals of FIGS. 7 to 13. Regarding structural components with the same denominations, in particular structural components having the same reference numerals, principally the drawings and/or the description of the exemplary embodiment of FIGS. 1 to 6 may be referred to.

FIG. 7 shows a first alternative energy absorption device 10b in a schematic perspective illustration. The first alternative energy absorption device 10b comprises a brake unit 12b with at least one deflection element 14b and with at least one brake element 16b that extends at least section-wise around the deflection element 14b. The brake unit 12b is configured for an at least partial absorption and/or conversion of kinetic energy in at least one load case. The first alternative energy absorption device 10b further comprises a connection unit 18b, which is configured for a fixation of the brake unit 12b in at least one location of use. The connection unit 18b comprises at least one shackle 20b with at least one bolt 22b, which forms the deflection element 14b.

The first alternative energy absorption device 10b differs from the energy absorption device 10a of the exemplary embodiment of FIGS. 1 to 6 in particular in that the first alternative energy absorption device 10b has no additional guiding element. On the contrary, the first alternative energy absorption device 10b comprises merely a housing element 30b for a guiding of the brake element 16b.

FIG. 8 shows a second alternative energy absorption device 10c in a schematic perspective view. The second alternative energy absorption device 10c comprises a brake unit 12c with at least one deflection element 14c and with at least one brake element 16c that extends at least section-wise around the deflection element 14c. The brake unit 12c is configured for an at least partial absorption and/or conversion of kinetic energy in at least one load case. The second alternative energy absorption device 10c further comprises a connection unit 18c, which is configured for a fixation of the brake unit 12c in at least one location of use. The connection unit 18c comprises at least one shackle 20c with at least one bolt 22c, which forms the deflection element 14c.

The brake element 16c is free of a material recess and/or an oblong hole. The brake element 16c has a constant cross section. The brake element 16c is embodied as a metal ribbon, in particular a steel ribbon, having a constant cross section over its entire length.

FIG. 9 shows a third energy absorption device 10d in a schematic perspective view. The third alternative energy absorption device 10d comprises a brake unit 12d with at least one deflection element 14d and with at least one brake element 16d extending at least section-wise around the deflection element 14d. The brake unit 12d is configured for an at least partial absorption and/or conversion of kinetic energy in at least one load case. The third alternative energy absorption device 10d further comprises a connection unit 18d, which is configured for a fixation of the brake unit 12d in at least one location of use. The connection unit 18d comprises at least one shackle 20d with at least one bolt 22d that forms the deflection element 14d.

The brake element 16d is at least section-wise rolled-up and/or wound-up. The brake element 16d is wound to a spiral 72d. The brake element 12d is wound in a multifold fashion. In the load case the brake element 12d is unwound and is pulled around the deflection element 14d. The third alternative energy absorption device 10d may comprise at least one guidance for the brake element 16d, which for example guides the brake element 16d in a region where it is wound-up or where it is to be unwound. It is further conceivable that the brake element 16d is wound on a drum and/or a cylinder or the like, the position of which is fixated in particular relative to the deflection element 14d, as a result of which the brake element 16d is in the load case unwound from the deflection element 14d.

FIGS. 10 to 13 show different alternative brake elements which could, for example, be used in the energy absorption devices 10a-d of the exemplary embodiments described above. FIG. 10 shows a first alternative brake element 16e in a schematic representation. The first alternative brake element 16e comprises a tapering material recess 28e. In particular, the material recess 28e is realized as a tapering oblong hole. Analogously a tapering deepening is of course also conceivable. The material recess 28e tapers towards a, viewed from a (not shown) deflection element, rear end of the first alternative brake element 16e. A local load capacity, in particular a rigidity, of the first alternative brake element 16e continuously increases with a tapering of the material recess 28e. Thus in a load case a counterforce advantageously also increases continuously. A force characteristic curve of the first alternative brake element 16e is adjustable via a geometry of the material recess 28e.

FIG. 11 shows a second alternative brake element 16f in a schematic representation. The second alternative brake element 16f is shown in FIG. 11 in a side view. The second alternative brake element 16f has a changing material thickness. In the present case a thickness of the second alternative brake element 16f changes continuously. Consequently the second alternative brake element 16f has a changing load capacity, in particular rigidity.

FIG. 12 shows a third alternative brake element 16g in a schematic representation. The third alternative brake element 16g has a thickness that changes step-wise. In the present case the third alternative brake element 16g is composed of a plurality of ribbon elements 66g, 68g, 70g. The ribbon elements 66g, 68g, 70g are in the present case steel ribbons. However, other materials and/or combinations of ribbon elements made of different materials are also conceivable. While in FIG. 12 three ribbon elements 66g, 68g, 70g are shown exemplarily, any other number is of course also conceivable.

FIG. 13 shows a fourth alternative brake element 16h in a schematic representation. The fourth alternative brake element 16h comprises in the present case two ribbon elements 66h, 68h, which are laid loosely over one another. The ribbon elements 66h, 68h may, for example, be implemented as steel ribbons. The ribbon elements 66h, 68h extend in different bends around a deflection element 14h. In a load case, for example, at first a first ribbon element 66h may be bent while a second ribbon element 68h is at first laid along the deflection element 14h by a traction force before it is, in the further course of the load case, also bent and pulled around the deflection element 14h. At the beginning of the load case a generated counter force is thus at first reduced and then increases when both ribbon elements 66h, 68h are pulled through simultaneously. Analogously, any other number of ribbon elements is of course conceivable.

The invention claimed is:

1. A net and/or rope construction brake with a brake unit which comprises at least one deflection element and at least one brake element extending at least section-wise around the deflection element and which is configured for an at least partial absorption and/or conversion of kinetic energy in at least one load case, and with a connection unit, which is configured for a fixation of the brake unit in at least one location of use, wherein the brake element is guided around the deflection element once, and wherein the brake element is subjected to a tensile load in the load case in such a way that the brake element is pulled around the deflection element and is deformed in a deformation process of the brake element, wherein the brake element comprises at least one first brake portion and at least one second brake portion, the brake portions differing from one another at least in regard to their local load capacities, and the first brake portion comprising at least one material recess, wherein the material recess extends at least section-wise around the deflection element.

2. The net and/or rope construction brake according to claim 1, wherein the connection unit is realized at least partly in a one-part implementation with the deflection element.

3. The net and/or rope construction brake according to claim 1, wherein the connection unit comprises at least one shackle with at least one bolt which is embodied at least partly in a one-part implementation with the deflection element.

4. The net and/or rope construction brake according to claim 1, wherein the first brake portion has a smaller rigidity than the second brake portion.

5. The net and/or rope construction brake according to claim 1, wherein the first brake portion extends at least section-wise around the deflection element.

6. The net and/or rope construction brake according to claim 1, wherein the brake element is embodied as a one-part metal ribbon.

7. The net and/or rope construction brake according to claim 1, wherein the brake element is at least section-wise rolled-up and/or wound-up.

8. The net and/or rope construction brake according to claim 1, wherein the brake unit comprises at least one housing element, which encompasses the brake element and the deflection element at least partly.

9. The net and/or rope construction brake according to claim 8, wherein the housing element is realized in a one-part implementation.

10. The net and/or rope construction brake according to claim 8, wherein the housing element is configured at least partly for a guiding of the brake element in the load case.

11. The net and/or rope construction brake according to claim 8, wherein the deflection element is supported in such a way that it is rotatable relative to the housing element.

12. The net and/or rope construction brake according to claim 1, wherein the brake unit comprises at least one guiding element, which is movable relative to the deflection element and is configured for an at least partial guiding of the brake element.

13. A construction kit for a production of the net and/or rope construction brake according to claim 1, with a connection unit and at least two brake units which have different braking characteristics and each of which is connectable with the connection unit.

14. A net and/or rope construction with the net and/or rope construction brake according to claim 1.

15. The net and/or rope construction brake according to claim 1, wherein the at least one material recess is an oblong hole.

16. A method for a production of a net and/or rope construction brake for safety nets and/or for rope constructions, with a brake unit which comprises at least one deflection element and at least one brake element extending at least section-wise around the deflection element and which is configured for an at least partial absorption and/or conversion of kinetic energy in at least one load case, in particular an impact case, and with a connection unit, which is configured for a fixation of the brake unit in at least one location of use, wherein the brake element is guided around the deflection element once, and wherein the brake element is subjected to a tensile load in the load case in such a way that the brake element is pulled around the deflection element and is deformed in a deformation process of the brake element, wherein the brake element comprises at least one first brake portion and at least one second brake portion, the brake portions differing from one another at least in regard to their local load capacities, and the first brake portion comprising at least one material recess, wherein the material recess extends at least section-wise around the deflection element.

17. A net and/or rope construction brake with a brake unit which comprises at least one deflection element and at least one brake element extending at least section-wise around the deflection element and which is configured for an at least partial absorption and/or conversion of kinetic energy in at least one load case and with a connection unit, which is configured for a fixation of the brake unit in at least one location of use, wherein the brake element is guided around the deflection element once, and wherein the brake element is subjected to a tensile load in the load case in such a way that the brake element is pulled around the deflection element and is deformed in a deformation process of the brake element, wherein the brake element comprises at least one first brake portion and at least one second brake portion, the brake portions differing from one another at least in regard to their local load capacities, and the first brake portion comprising at least one material recess, wherein the brake unit comprises at least one housing element, which encompasses the brake element and the deflection element at least partly and wherein the deflection element is supported in such a way that it is rotatable relative to the housing element.

* * * * *